3,600,423
PREPARATION OF HYDROXY-CAPRONITRILE
Gerardus I. J. Dreessen, Geleen, Netherlands, assignor to Stamicarbon N.V., Heerlen, Netherlands
No Drawing. Filed June 20, 1969, Ser. No. 835,220
Claims priority, application Netherlands, June 21, 1968, 6808725
Int. Cl. C07c 121/02
U.S. Cl. 260—465.2
1 Claim

ABSTRACT OF THE DISCLOSURE

Preparation of hydroxy-capronitrile by reaction in the vapour phase of ε-caprolactone with ammonia, the reaction temperature being maintained at 270–325° C. and zinc oxide being used as a catalyst.

The present invention relates to a process for the preparation of hydroxy-capronitrile from ε-caprolactone.

It is known (cf. the German patent specification No. 1,089,759) that a lactone can be reacted with ammonia at temperatures of 200–450° C., to form the corresponding hydroxy carboxylic acid nitrile. This reaction is carried out with the aid of acid catalysts, e.g. phosphoric acid, sulphuric acid, or acid salts of these acids. In this process the formation of the nitrile of unsaturated carboxylic acid as a by-product can be suppressed by maintaining a low degree of conversion in the reaction.

A process of preparing hydroxy-capronitrile from ε-caprolactone has now been discovered in which the reaction with ammonia is carried out in the vapour phase, the reaction temperature being maintained at 270–325° C. and zinc oxide being used as catalyst.

By carrying out the reaction with ammonia in this way, a high yield of hydroxy-capronitrile is obtained.

This process does not require the use of an elevated pressure, it being possible to carry out the reaction in a simple way—preferably as a continuous process—at atmospheric pressure.

In view of the boiling point of hydroxy-capronitrile (270° C.), the minimum temperature used for the reaction is 270° C. It should further be stated that at temperatures above 325° C. only small amounts of hydroxy-capronitrile are obtained, so that such high temperatures are avoided.

The ε-caprolactone can easily be brought into the vapour phase with the aid of a carrier gas, e.g. hydrogen or nitrogen, after which the vapour, together with the ammonia, is contacted with the catalyst at the reaction temperature.

The resulting hydroxy-capronitrile is an industrially important product, in that, for instance, it can be used for preparing hexamethylene diamine, which is used as a starting material for nylon.

EXAMPLES I–IX

Into a tubular reaction compartment (height 25 cm., diameter 2.5 cm.) filled with zinc oxide grains (diameter 3 mm.) a continuous stream of mixed caprolactone vapour, hydrogen and ammonia (in the molecular proportion 1:7:18) is introduced. The caprolactone is fed in at the rate of 5–10 g. per hour, the residence time is 2–5 seconds.

The temperature in the reaction compartment is maintained at the values given in the table. The experiments were carried out at atmospheric pressure.

The vapour mixture discharged from the tube is condensed, and the liquid separated out is distilled at a temperature of 230–240° C., in which distillation non-converted caprolactone is recovered, and the hydroxy-capronitrile is left behind as residue.

The results are shown in the table.

| Example Number | Temperature (° C.) | Conversion (moles percent) | Yield of hydroxy-capronitrile (percent) |
|---|---|---|---|
| 1 | 270 | 60 | 100 |
| 2 | 275 | 26 | 100 |
| 3 | 295 | 73 | 100 |
| 4 | 300 | 50 | 100 |
| 5 | 320 | 87 | 73 |
| 6 | 325 | 86 | 72 |
| 7 | 340 | 96 | 32 |
| 8 | 350 | 91 | 16 |
| 9 | 380 | 100 | 4 |

What is claimed is:
1. Process for the preparation of hydroxy-capronitrile from ε-caprolactone by catalytic vapour-phase reaction with ammonia, the improvement comprising maintaining the temperature at 270–325° C., and employing zinc oxide as the catalyst.

References Cited
UNITED STATES PATENTS
3,043,860 7/1962 Phillips et al. _____ 260—465.2
3,121,733 2/1964 Von Schickh et al. __ 260—465.2
3,450,741 6/1969 Becke et al. _____ 260—465.2

JOSEPH P. BRUST, Primary Examiner